US005972544A

United States Patent [19]

Carr et al.

[11] Patent Number: 5,972,544

[45] Date of Patent: Oct. 26, 1999

[54] PRINTING PROCESS

[75] Inventors: Kathryn Carr, Preston; Mark Holbrook, Ramsbottom Bury; Ian Ferguson, Todmorden, all of United Kingdom

[73] Assignee: Zeneca Limited, London, United Kingdom

[21] Appl. No.: 08/750,347

[22] PCT Filed: May 18, 1995

[86] PCT No.: PCT/GB95/01122

§ 371 Date: Dec. 9, 1996

§ 102(e) Date: Dec. 9, 1996

[87] PCT Pub. No.: WO95/34024

PCT Pub. Date: Dec. 14, 1995

[30] Foreign Application Priority Data

Jun. 9, 1994 [GB] United Kingdom .................. 9411586

[51] Int. Cl.[6] ................................ G02B 5/20; B05D 3/02

[52] U.S. Cl. ............................... 430/7; 427/511; 427/164; 427/165; 427/385.5; 534/769; 534/792

[58] Field of Search ............................ 430/7; 8/692, 444, 8/445; 534/769, 792, 617, 643; 106/31.27, 31.5; 427/487, 508, 511, 164, 385.5, 165; 347/96; 349/106

[56] References Cited

U.S. PATENT DOCUMENTS

| | | |
|---|---|---|
| 3,499,781 | 3/1970 | Krueckel . |
| 5,231,135 | 7/1993 | Machell et al. . |
| 5,374,493 | 12/1994 | Fukunaga et al. .......................... 430/7 |

FOREIGN PATENT DOCUMENTS

| | | |
|---|---|---|
| 449 012 | 10/1991 | European Pat. Off. . |
| 492 444 | 7/1992 | European Pat. Off. . |
| 35 09 198 | 11/1985 | Germany . |
| 5-027113 | 2/1993 | Japan . |
| 5-224077 | 9/1993 | Japan . |
| 85/04679 | 10/1985 | WIPO . |

*Primary Examiner*—John A. McPherson
*Attorney, Agent, or Firm*—Pillsbury Madison & Sutro LLP

[57] ABSTRACT

A process for preparing an optical filter comprising a colored cross-linked polymeric coating an a transparent substrate, which comprises applying to the substrate, by a printing process, a mixture comprising one or more polymer precursor(s), and one or more dye(s) having one or more heterocyclic NH group(s) or one or more substituent(s) capable of forming a covalent bond with the polymeric precursor, and thereafter using the mixture. The invention also provides formulations comprising one or more polymer precursors and dyes, optical filters, and a novel dye.

15 Claims, No Drawings

PRINTING PROCESS

This application is the national phase of international application PCT/GB95/01122 filed May 18, 1995 which designated the U.S.

This invention relates to processes for printing substrates, to a mixture of polymer precursor and dye, to a process for making optical filters, to optical filters and to novel dyes.

Published European Application No 546,856 proposes a process for making colour filters (for use e.g. in liquid crystal displays) which uses a photosensitive resin resist composition containing a dye which either has a photopolymerisable substituent or has a molecular weight in the range from 500 to 4000. The dye is said to be immobilised in the resin matrix either by its high molecular weight, or by self-polymerisation or by co-polymerisation of the dye with the photosensitive resist resin.

Published European Patent Application No 531,106 proposes colour filters in which the light-filtering substance comprises the result of the reaction of a binder polymer with a reactive dye. The reactive groups in the binder polymer are hydroxy or amino groups, while the reactive dye is of cellulose-reactive type, containing either a vinylsulphone group (or a precursor thereof), or an electrophilic reactive group (e.g. a chlorine atom attached to a triazine ring), or a mixture of these types.

Published European Patent Application No. 564,237 proposes a process of making a colour filter using a photosetting resin precursor and a dyestuff which can uniformly colour the photocured resin.

U.S. Pat. No. 5,176,971 proposes a method of making a colour filter in which the filter picture elements (red, green and blue) are made of polyimide resin containing a dye.

U.S. Pat. No. 4,781,444 proposes a method of making a colour filter by electrodeposition of a coloured layer on a substrate. The coloured layer comprises a polymer having a dye chemically bonded to it. The dye used is a cellulose-reactive dye containing for example a vinyl sulphone group or an electrophilic reactive group (e.g. a chlorine atom attached to a triazine ring), as described above for European Patent Application 531,106.

U.S. Pat. No. 5,231,135 proposes a method of making a coloured polymer coating on a substrate, in which the coloured polymer is prepared by reaction of a colourant of formula R-[polymeric constituent-X]$_n$ wherein R is an organic dyestuff radical and X is a reactive moiety (e.g. —OH, —$NH_2$, or —SH) with a linking agent (e.g. a polyisocyanate or a melamine-formaldehyde resin), which in turn reacts with a polymer having reactive groups and links the colourant with the polymer. In an alternative embodiment, the colourant is reacted directly with the polymer, without a linking agent. The coloured polymers are said to be useful as coatings for automobiles.

According to a first aspect of the present invention, there is provided a process for preparing an optical filter comprising a coloured cross-linked polymeric coating on a transparent substrate, which comprises applying to the substrate, by a printing process, a mixture comprising one or more polymer precursor(s), and one or more dye(s) capable of forming a covalent bond with the polymeric precursor via a heterocyclic NH group in a heterocyclic part of the dye or via substituent groups selected from —OH; —NHR; —SH; —COOR; epoxy; —NHCOalkenyl; or —COalkenyl, in which R is —H or alkyl, and thereafter curing the mixture.

The term heterocyclic NH group means an NH group in which the nitrogen atom forms part of a heterocyclic ring. In many dyes the heterocyclic NH group will itself be capable of forming a covalent bond with the polymer precursor.

The polymer precursor may be any organic monomer, comonomer, polymer or copolymer and mixtures thereof having groups which are capable of reacting directly with the dye(s). Where mixtures of different polymer precursors are used at least one of the polymer precursors is required to be capable of reacting with the dye(s). Examples of polymer precursors include acrylates, methacrylates, acrylamides, methacrylamides, epoxides, esters, urethanes, isocyanates, alcohols, vinylalcohols, imides, amides, phenols, acetates, carbonates and their derivatives, amines, carboxylic acids and orthoformaldehyde condensates, polyacrylic resins, polyvinylalcohol resins, melamine formaldehyde resin condensates, alkyd resins, epoxy resins, polyimides, polyamide resins, phenolic resins, polyester resins, polyvinylacetate, polycarbonate resins, urethane resins and their derivatives and copolymers.

The polymer precursor is preferably selected from acrylamides, epoxides, epoxy resins, acrylamide/epoxy resin systems, melamine formaldehyde resin condensates, polyesters, alkyd resins, hydroxylated or carboxylated acrylics, hydroxylated acrylic-melamine formaldehyde systems and especially from acrylamide/epoxy resin systems and hydroxylated acrylic-melamine formaldehyde systems.

For the purposes of the present specification dye means a compound which absorbs radiation from part of the electromagnetic spectrum and includes compounds which are infra red (IR) or ultraviolet (UV) absorbers which may or may not be coloured and coloured compounds which absorb radiation in the visible part of the electromagnetic spectrum. The dye may be referred to below as a polymer-reactive dye. It is preferably a dye with inherently high light-fastness. The dye may be selected from the monoazo, disazo, azomethine, quinophthalone, cyanine, pyrroline, maleimide, thiophenedioxide, anthraquinone, phthalocyanine, benzofuranone, benzodifuranone, triphenodioxazine, triphenazonaphthylamine, styryl, dithiene and pyrrole dye classes. Dyes are preferably those which may form covalent bonds with the polymers via a heterocyclic NH group in a heterocyclic part of the dye or via substituent groups selected from —OH; —NHR, —SH or —COOR in which R is —H or alkyl; epoxy; —COalkenyl such as —CO-vinyl and —NHCOalkenyl such as —NHCOvinyl each of which may be attached directly to the dye or via optionally substituted alkyl or aryl groups. The —OH, —NHR and —SH groups are preferably attached to aliphatic carbon atoms (e.g. —$CN_2$—) to make them more reactive towards polymer precursors. Generally preferred dyes are those which have substituent groups which aid the solubility of the dye(s) in liquid media used in the process or which aid the solubility of the dye(s) in the polymer precursor(s).

A preferred azo dye is a dye of Formula (1):

A—N═N—D  Formula (1)

in which:

A is an optionally substituted heterocyclic or carbocyclic group; and

D is an optionally substituted heterocyclic or carbocyclic group or a group of Formula (2):

—E—N═N—G  Formula (2)

in which:

E and G each independently is an optionally substituted heterocyclic or carbocyclic group.

The heterocyclic group represented by A, D, E and G may be selected from thienyl, thiazolyl, isothiazolyl, pyrazolyl, benzopyrazolyl, imidazolyl, pyridyl, pyridmyl, thiadiazolyl, furanyl, pyrrolyl, pyridazyl, pyrimidyl, pyrazinyl, benzothiazolyl, benzoisothiazolyl, quinolinyl, isoquinolinyl, indolyl, pyridothiazolyl, pyridoisothiazolyl, triazolyl, pyrrolyl, dioxazolyl, oxazolyl, isooxazolyl, imidazolyl and carbazolyl.

The carbocyclic group represented by A, D, E and G may be phenyl or naphthyl.

A is preferably phenyl, pyrazolyl, triazolyl, pyrrolyl, indolyl or carbazolyl, more preferably phenyl or pyrazolyl.

Where A is phenyl it is preferably of Formula (3):

Formula (3)

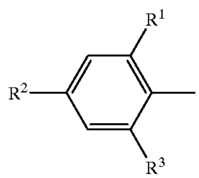

A preferred sub group of dyes are those of Formula (1) in which A is of Formula (3), in which:

$R^1$, $R^2$ and $R^3$ each independently is alkyl, alkoxy each of which may be optionally substituted, —H, —F, —$NO_2$, —Cl, —Br, —I, —CN, —$CF_3$, $SO_2F$, —$COOR^{18}$, —$SO_2R^{18}$, —$COR^{18}$, —$SO_2NR^{18}R^{19}$ or —$CONR^{18}R^{19}$ which $R^{18}$ and $R^{19}$ each independently is alkyl or aryl, each of which may be optionally substituted, or —H.

Where A is pyrazolyl it is preferably of Formula (4):

Formula (4)

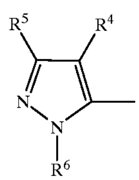

in which:

$R^4$ is —H, —CN, —$NO_2$, —F, —Cl, —Br, —$COR^{18}$, —$CONR^{18}R^{19}$, —$SO_2R^{18}$, —$SO_2NR^{18}R^{19}$ or —$COOR^{18}$;

$R^5$ is —H, aryl, —CN, —$SO_2R^{18}$, alkyl or alkyl substituted by —CN, —$CSNR^{18}R^{19}$, —$SR^{18}$ or —$COOR^{18}$; and $R^6$ is —H, alkyl, aryl, alkenyl, —$SO_2R^{18}$, —$COR^{18}$ or alkyl substituted by —CN or —$COOR^{18}$.

D is preferably phenyl or pyrazolyl. Where D is phenyl it is preferably a phenyl of Formula (5):

Formula (5)

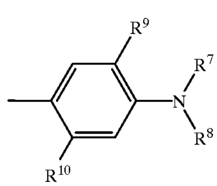

in which:

$R^7$ and $R^8$ each independently is —H or alkyl or aryl each of which may be optionally substituted by —OH, —COOH, —COOalkyl, —CN, phenyl, phenoxy, alkoxy; alkyl, —Cl, —Br, alkenyl, alkynyl, —$CHF_2$, —$NH_2$, —NHalkyl, —SH, epoxy, —COalkenyl or —NHCOalkenyl.

$R^9$ is —H, alkyl, alkoxy, —OH, —Cl, —Br, —COOH, —NHCOalkyl, —$NO_2$ or —COOalkyl; and $R^{10}$ is —H, —OH, alkyl, —$NR^{18}R^{19}$, —$NHCOR^{18}$, —$NHSO_2R^{18}$, —$NHCONHR^{18}$, —$NHCOOR^{18}$ or —NHCOalkenyl.

Where D is pyrazolyl it is preferably of Formula (6):

Formula (6)

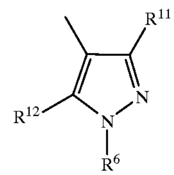

in which:

$R^{11}$ is —H, alkyl or aryl;

$R^{12}$ is —$NH_2$ or —NHalkyl; and $R^6$ is as hereinbefore defined.

E is preferably phenyl, thienyl or isothiazolyl, more preferably a phenyl of Formula (7):

Formula (7)

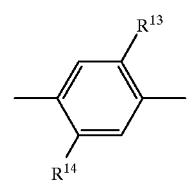

in which:

$R^{13}$ is —H, —OH, alkoxy, alkoxyalkoxy, —$NHCOR_{18}$ or —$NHSO_2R^{18}$; and $R^{14}$ is —H, —NHCOalkyl or —NHCOaryl.

G is preferably phenyl or pyrazolyl more preferably a phenyl of Formula (5) or pyrazolyl of Formula (6).

Where a group represented by R, $R^1$, $R^2$, $R^3$, $R^5$, $R^6$, $R^9$, $R^{10}$, $R^{11}$, $R^{12}$, $R^{13}$, $R^{14}$, $R^{18}$ or $R^{19}$ is or contains an alkyl or alkoxy group it is preferably a $C_{1-6}$-alkyl or $C_{1-6}$-alkoxy group.

Where a group represented by $R^5$, $R^6$, $R^7$, $R^8$, $R^{11}$, $R^{18}$ or $R^{19}$ is or contains an aryl group it is preferably a phenyl or naphthyl group more preferably a phenyl group.

Where a group represented by $R^6$, $R^7$, $R^8$, $R^{10}$ is or contains an alkenyl group it is preferably a $C_{2-6}$-alkenyl more preferably vinyl or allyl.

Where a group represented by $R^7$ or $R^8$ contains an alkynyl group it is preferably $C_{2-6}$-alkynyl.

The alkyl or alkoxy group or substituents containing alkyl or alkoxy groups represented by any one of R, $R^1$ to $R^3$ and $R^5$ to $R^{14}$, $R^{16}$, $R^{18}$ and $R^{19}$ may be straight or branched chain alkyl or alkoxy groups. Where any of the groups represented by A, D, E, G, $R^1$ to $R^3$, $R^7$ and $R^8$ is optionally substituted the substituents are preferably selected from —$OR^{18}$, —$NR^{18}R^{19}$, —$COOR^{18}$, —$SO_2R^{18}$, —$COR^{18}$, —$SO_2NR^{18}R^{19}$, —$CONR^{18}R^{19}$, —$SR^{18}$, —$NHCOR^{18}$, —$NHSO_2R^{18}$, —$NHCOOR^{18}$, $C_{1-6}$alkyl and $C_{1-6}$alkoxy in which $R^{18}$ and $R^{19}$ are as hereinbefore defined.

$R^1$, $R^2$ and $R^3$ each independently is preferably —F, —Cl, —Br, —CN, —$SO_2R^{18}$, —$SO_2NHR^{18}$, —$NO_2$, —$CF_3$, —$COOR^{18}$ or —$COR^{18}$ in which $R^{18}$ is as hereinbefore defined.

$R^4$ is preferably CN, $COR^{18}$, $CONR^{18}R^{19}$, $COOR^{18}$.

$R^5$ is preferably phenyl or —CN.

$R^6$ is preferably —H.

$R^7$ and $R^8$ each independently is preferably $C_{1-10}$-alkyl, more preferably $C_{1-8}$-alkyl or $C_{1-6}$-alkyl substituted by —OH and especially alpha-branched $C_{1-8}$-alkyl or $C_{2-6}$-alkyl substituted by —OH.

$R^9$ is preferably —H, $—OCH_3$, $—NO_2$, $—CH_3$, —COOH, $—COOCH_3$.

$R^{10}$ is preferably —H, $—NHCOCH_3$, $—CH_3$, more preferably $—NHCOCH_3$.

$R^{11}$ is preferably $C_{1-4}$-alkyl.

$R^{12}$ is preferably $—NH_2$.

$R^{13}$ is preferably —H, $C_{1-6}$-alkoxy or $C_{1-6}$-alkoxy$C_{1-6}$-alkoxy.

$R^{14}$ is preferably —H, —OH, $C_{1-6}$-alkyl, —NHCOphenyl or $—NHCOC_{1-6}$-alkyl.

Further preferred dyes are mono and disazo dyes, especially those having at least one heterocyclic component and particularly those where the heteroatom of the heterocyclic component can react with the polymer precursor to form a covalent bond. Such dyes have the advantage of being stronger, brighter colours with good light and heat fastness properties.

Especially preferred dyes of Formula (1) are of Formula (8):

Formula (8)

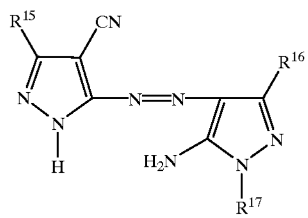

in which:

$R_{15}$ is phenyl, $—CH_2CN$ or —CN;

$R^{16}$ is $C_{1-4}$-alkyl; and $R^{17}$ is —H or phenyl and Formula (9):

Formula (9)

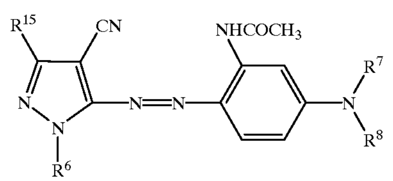

in which:

$R^6$ is —H, $C_{1-6}$-alkyl or $C_{1-6}$-alkyl substituted by —CN or $—COOC_{1-6}$-alkyl;

$R^7$ and $R^8$ each independently is $C_{1-6}$-alkyl, a-branched $C_{3-6}$-alkyl or $C_{1-6}$-alkylOH; and $R^{15}$ is phenyl, $—CH_2CN$ or —CN.

The dyes of Formula (8) form a further feature of the present invention.

A specific example of a dye of Formula (8) is Dye 1 in which $R^{15}$ is —CN, $R^{16}$ is t-butyl and $R^{17}$ is phenyl.

Specific examples of dyes of Formula (9) are Dye 2 in which $R^6$ is —H, $R^7$ is ethyl, $R^8$ is ethyl and $R^{15}$ is —CN and Dye 3 in which $R^6$ is —H, $R^7$ is ethyl, $R^8$ is 1-methylpropyl and $R^{15}$ is phenyl.

A further preferred sub group of dyes are phthalocyanines of the type:

$MPC(X)_n$ in which

M is H, Si, Ge, metal, oxymetal, hydroxymetal or halometal;

X is or carries a substituent group or atom capable of forming a covalent bond with a polymer precursor;

n is from 1 to 16;

Pc is a phthalocyanine nucleus.

M is preferably H, a transition metal, a halometal, Si or Ge and more preferably H, Ni, Cu, Mn, Fe, Sn, Co, Ti, V, halo Al such as ClAl, haloIn such as ClIn, Si or Ge.

x preferably is a group which carries a heteroatom such as N, O or S, more preferably a substituent group selected from —OH; —NHR, —SR, —COOR, —SOOR, $—SO_2NHR$ in which R is —H, alkyl, epoxy, —COalkenyl or —NHCOalkenyl or a heteroatom such as N, O or S in a 5-, 6- or 7-membered saturated or unsaturated ring. Each of the substituents or rings containing heteroatoms represented by X may be attached to the phthalocyanine nucleus either directly or via alkyl, aryl, Salkyl, Saryl, oalkyl, Oaryl, Nalkyl or Naryl groups or any combination thereof.

n is preferably from 1 to 8, more preferably from 1 to 4 and especially 2, 3 or 4.

Preferred phthalocyanines are those having 4 X substituents. Particularly tetrasulphonamidophthalocyanines and especially those in which X is $—SO_2NH—R—Z$ or

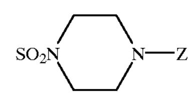

in which R is branched or straight chain alkyl, aryl or aralkyl each of which may be optionally substituted and Z is a group selected from alkyl OH, $alkylNH_2$, $alkylCO_2H$ preferably alkylOH.

The phthalocyanines are especially useful in coloured films, particularly those prepared by reaction of the phthalocyanine, a thermosetting acrylic polymer precursor and water, which have been applied to glass plates and cured. Such coloured films have excellent heat, light and solvent fastness properties.

A preferred type of dye is a dye in which the substituent capable of forming a covalent bond with the polymer precursor is isolated from the chromophore, for example a dye having an alkylOH substituent. In this type of dye, reaction with the polymer precursor does not cause any appreciable change in colour.

The dyes used in the present invention may be prepared by conventional means. Thus, for example, the monoazo and disazo dyes may be formed by diazotisation of an amine and coupling.

Phthalocyaninep, of Formula MPc $(X)_n$ may be conveniently prepared by published procedures. For example, heating copper phthalocyanine firstly with chlorosulphonic acid and then with phosphorus pentachloride forms copper phthalocyanine tetra(sulphonylchloride) which may be isolated from the reaction mixture by filtration. The copper phthalocyanine tetra(sulphcnylchloride) may be further reacted with an amino compound in a liquid medium such as dioxan to produce a tetra(sulphonamide) derivative.

Preferred anthraquinone dyes include compounds of the Formula (10):

Formula (10)

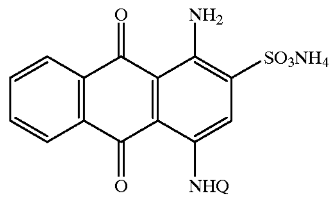

in which Q is a meta or para linked group of Formula:

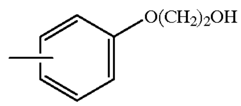

The cross-linked polymeric coating may be formed on a substrate to which the coating will bond, adhere, absorb or fuse. Suitable transparent substrates include glass; plastics films and plates such as those of polyvinylalcohol, polyester, polyvinylchloride, polyvinylfluoride, polycarbonate, polystyrene, polyamide or polyimide. A preferred substrate is glass.

The substrates may be pre-treated to improve bonding, adhesion, absorption, fusion or spreading of the cross-linked polymeric coating on the substrate. Suitable pre-treatments include plasma ashing in which the substrate is placed in an oxygen atmosphere and subjected to an electrical discharge or application of an adhesion promoter such as a silane.

In the present process the cross-linking of the polymer precursor(s) may be initiated thermally, chemically or photochemically. Similarly the reaction between the polymer precursor(s) and dye(s) may be initiated thermally, chemically or photochemically. The reaction between polymer precursor(s) and dye(s) may, where they are sufficiently reactive, be initiated simply by mixing the polymer precursor(s) and dye(s) each optionally in a liquid medium and allowing the mixture to air dry.

The mixtures of polymer precursors and specified dyes can also be used to give coloured, transparent films and coatings on substrates in general, including substrates which are not transparent. Accordingly a further feature of the invention provides a process for preparing a transparent, coloured cross-linked polymeric coating on a substrate which comprises applying to the substrate, by a printing process, a mixture comprising one or more polymer precursor(s) and one or more dye(s) capable of forming a covalent bond with the polymer precursor via a heterocyclic NH group in a heterocyclic part of the dye or via substituent groups selected from —OH; —NHR; —SH; —COOR; epoxy; —NHCOalkenyl; or —COalkenyl, in which R is —H or alkyl, and thereafter curing the mixture.

Where the polymer precursor used in processes of the invention is one which is itself capable of cross-linking when cured (e.g. melamine—formaldehyde resin condensate) no additional cross-linking agent need be added to the mixture of dye and polymer precursor. However, where the polymer precursor is one which is not itself capable of extensive cross-linking, it may be desirable to add a cross-linking agent to the mixture of dye and polymer precursor. Thus, for example, in Example 2 below, where acrylamide is used as the polymer precursor, an epoxide is added as a cross-linking agent. The use of cross-linking agents is well known in the polymer art, and the choice of cross-linking agent will be readily made by one skilled in the art.

Where the dye(s) and polymer(s) used in the present process are substantially unreactive at normal temperatures and pressures the printing process or curing is preferably carried out at a temperature of from 80° C. to 250° C., more preferably at from 100° C. to 200° C. and especially at from 110° C. to 180° C.

Chemical initiation may be achieved by addition of agents such as epoxides, amines, armcania, acids, dicyandiamides and acid anhydrides.

Photochemical initiation may be achieved by addition of initiators for example azides, ketones such as acetophencne or benzophenone, ketals such as benzyldimethyl ketal, peroxides such as benzoyl peroxide or aryl sulphonium salts such as diphenyl-(4-phenylthio)-phenyl sulphonium tetrafluorophosphate, followed by irradiation with UV or visible light.

Thermally initiated cross-linking and reaction is preferred since it has the advantage of simplicity (avoiding the need to add initiators, etc to the mixture) over chemical and photochemical initiation.

The mixture of polymer precursor(s) and dye(s) used in the present process may further comprise one or more formulating agents and one or more liquid(s) may be added to the mixture to improve the solubility of dye in the polymer precursor(s) and vice versa, and to improve the flow and handling properties of the mixture. The liquid(s) may be aqueous or organic. The liquid is preferably water, an aromatic hydrocarbon such as toluene or xylene, a ketone such as cyclohexanone, 2-pyrrolidone, N-methylpyrrolidone, methyl ethyl ketone, an ester such as ethyl acetate or ethyl propionate, an alcohol such as methyl, ethanol or isopropanol, glycols such as ethylene glycol, diethyleneglycol, hexylene glycol, glycol ethers such as ethylene glycol monobutylether, ethers such as tetrahydrofuran or mixtures thereof. More preferably the liquid is a ketone such as methyl ethyl ketone or water, or mixtures thereof.

Where a liquid(s) is added to the mixture the printed substrate may be dried by heating or by air drying at ambient temperature to evaporate the liquid before the coating is cured or during curing.

The mixture of polymer precursor(s) and dye(s) may further comprise one or more pigments. Such pigments generally do not react with the polymer precursor(s) or the dye(s) and may be used in combination with the dye(s) for shading purposes. Where the dye(s) is not significantly coloured i.e. it is an IR or UV absorber as described above the pigment may be the sole colorant.

In the present processes the printing process may be any printing process such a flexographic, off-set lithographic, gravure, intaglio printing, ink-jet, dye diffusion thermal transfer and screen printing processes. The printing process is preferably ink-jet printing, especially thermal or piezoeletric ink-jet printing. The principles and procedures for ink jet printing are described in the literature for example in High Technology Applications of Organic Colorants, P. Gregory, Chapter 9 ISBN 0-306-43637-X.

According to a further feature of the present invention there is provided a formulation comprising a mixture comprising one or more polymer precursor(s) and one or more dye(s). The polymer precursor(s) and dye(s) are as hereinbefore defined.

Optical filters, alternatively known as colour filters, are used in liquid crystal displays, for example in small television receivers.

A process for preparing an optical filter according to the present invention may comprise the steps of:

(1) mixing a polymer precursor(s) of for example an acrylic resin, a dye(s) and optionally a dispersant such as an anionic types for example lignosulphonates and other sulphonated aromatic species or non-ionic types for example alkylene oxide adducts in a suitable mixing apparatus such as a three-roller roll mill and mixing in an aqueous or organic solvent or a combination of the two in the mixing apparatus;

(2) adding as appropriate for chemically or photochemically initiated systems either a radical source or a combination of a photopolymerisation initiator and polymer precursor(s) to the resultant preparation for producing a varnish coloured in one of the desired colours such as typically the three primary additive colours of red, green and blue;

(3) forming on the surface of a transparent substrate a multiplicity of discrete filter regions of the varnish distributed in a desired patterm and optically setting the individual filter regions;

(4) heating the optically set filter regions on the substrate causing reaction of the polymer precursor(s) and dye(s) contained in the filter regions and thereby forming discrete filter elements of a optical filter composition comprising the polymer, dye(s) and optional dispersant.

The discrete coloured filter regions of the optical filter composition may be formed in step (3) by forming a uniformly thick layer of the coloured varnish on the surface of the substrate and subsequently patterning the layer of the coloured varnish into discrete filter regions distributed in a desired pattern while optically setting the individual filter regions. Alternatively, the discrete coloured filter regions may be formed by applying the varnish in a desired pattern onto the surface of the substrate.

These steps (1) to (4) are followed for each of the desired colours to form a multi-colour optical filter structure so that the filter structure finally comprises the transparent substrate and a single layer of differently coloured filter elements arranged in triads or in any desired groups each consisting of a predetermined number of differently coloured filter elements.

Where the process used for applying the polymer precursor/reactive dye mixture to the transparent substrate is ink jet printing, it is possible to achieve printing of all three primary colours (red, green and blue) simultaneously to form triads or any desired groupings of filter elements by using a printing head having appropriately designed outlets for the three coloured polymer precursor/reactive dye mixtures.

Red filter elements prepared according to the invention are usually made by using a mixture of magenta and yellow dye. Specific examples of yellow dyes include those of Formula (8) above in which $R^{15}$ is cyano or cyanomethyl, $R^{16}$ is tert butyl, and $R^{17}$ is phenyl. These dyes are soluble in organic solvents. Examples of water-soluble yellow dyes include those of the following Formula:

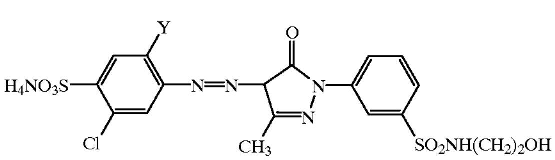

in which Y is Cl or $SO_3NH_4$.

Examples of magenta dyes include compounds of Formula (9) above having the substituents shown in the following table

| $R^6$ | $R^{15}$ | $—NR^7R^8$ |
|---|---|---|
| H | Ph | $—N(Et)_2$ |
| H | Ph | —N(Et) (2-Bu) |
| H | $NCCH_2$ | —N(Et) (2-Bu) |

and the compounds of the following Formula:

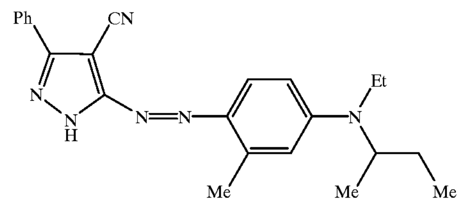

These compounds are soluble in organic solvents. Me is methyl, Et is ethyl, Bu is butyl and Ph is phenyl.

Green filter elements prepared according to the invention are usually made by using a mixture of cyan and yellow dyes.

Examples of cyan dyes include phthalocyanine dyes having the following formulae:

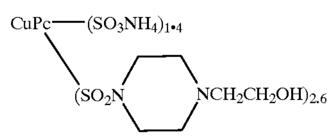

and

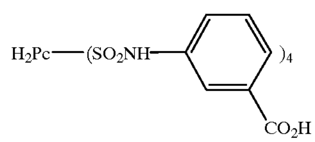

These dyes are water-soluble.

Blue filter elements prepared according to the invention are usually made by using a single blue dye. Examples of blue dyes include the phthalocyanines shown above.

According to a further feature of the present invention, there is provided an optical filter, comprising red, green and blue filter elements, and comprising a coloured polymeric coating on a transparent substrate, in which at least one of the filter elements comprises a dye covalently bonded to the polymer of the polymeric coating as a result of reaction between a heterocyclic NH group in a heterocyclic part of the dye, or a substituent in the dye selected from —OH; —NHR; —SH; or COOR; epoxy; —COalkenyl; or —NHCOalkenyl, in which R is H or alkyl; and the polymer precursor used to form the polymeric coating.

Usually, at least the red and the green elements of the colour filter will contain a dye covalently bonded to the polymer, while the blue element may contain an anthraquinone dye of the formula above which is not covalently bonded to the polymer.

The polymer precursor(s) and dye(s) are as hereinbefore defined.

The invention is further illustrated by the following examples:

EXAMPLE 1

Preparation of 2-(4-cyano-3-phenyl-1(H)-pyrazole-5-azo)-5-(N-sec-butyl-N-ethylamino)-acetanilide

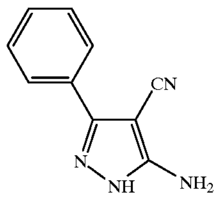

1. A solution of triethylamine (98%, 66.66 g, 0.71 mol) in dry toluene (500 ml) was added over 2 hours to a stirred solution of malononitrile (21.78 g, 0.07 mol) and benzoyl chloride (46.4 g, 0.08 mol) in dry toluene (300 ml) whilst maintaining a temperature of below 35° C. The mixture was stirred for a further 2 hours at room temperature before being allowed to stand overnight. The mixture was filtered to remove the triethylammonium chloride. This was washed with one portion of toluene (200 ml). A dark oil settled out in the filtrate which was isolated by decanting off the bulk of the solvent and removing the rest by evaporation under reduced pressure. The viscous oil was acidified with dilute aqueous sulphuric acid (2M, 11) and the acidic solution was extracted with diethyl ether (4×100 ml). The combined extracts were dried aver anhydrous magnesium sulphate, filtered and the solvent was evaporated under reduced pressure. The viscous black residue was redissolve in methanol (30 ml) and precipitated by pouring into a large volume of cold water. The buff coloured solid was collected by suction filtration and recrystallised from water to yield the required benzoyl malononitrile (13.36 g,24%) as an off white solid.
2. Dimethyl sulphate (67.52 g, 0.54 mol) was added slowly to a stirred solution of benzoyl malononitrile (12.92 g, 0.08 mol) and sodium bicarbonate (50.65 g, 0.60 mol) in water (12 ml) and 4,4-dicxane (122 ml). The temperature was elevated to 80–90° C. and maintained for 2 hours. After cooling, the mixture was poured into iced water (1.5 l) and the precipitate was collected by suction filtration, washed with water and dried in vacuo to afford the methylated product (9.44 g, 68%) as an off white solid.
3. The product from the above reaction (9.2 g, 0.05 mol) was slurried in methylated spirits (40 ml). Hydrazine hydrate (100%, 25 g, 0.50 mol) was added slowly with cooling to maintain the temperature of the reaction mixture between 25–30° C. When the addition was complete, the temperature was raised to 80–85° C. for 1 hour. After cooling, the reaction mixture was poured into iced water (500 ml) and the fine, white precipitate was collected by suction filtration, washed and dried in vacuo. This furnished the requisite diazo component (8.34 g, 91%) as a white solid.

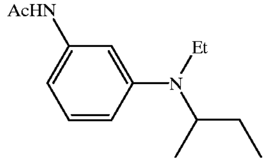

1. A mixture of 3-aminmo acetanilide (146.7 g, 0.45 mol), sec-butyl bromide (74 g, 0.54 mol) and potassium caxbonate (68.25 g, 0.49 mol) in dimethyl formmide (300 ml) was stirred at 90° C. overnight. After cooling, the mixture was diluted with saturated sodium chloride solution (500 ml) and extracted with dichloromethane (200 ml). Me organic extract was washed with water (2×200 ml), dried over anhydrous magnesium sulphate and filtered. Evaporation of the solvent in vacuo gave the N-sec-butyl derivative (34.13 g, 37%) as a viscous brown oil which solidified on standing.
2. A mixture of the 3-(N-sec-butylamino)-acetanilide (6.19 g, 0.03 mol), bromoethane (4.36 g, 0.04 mol) and calcium carbonate (4 g, 0.04 mol) in water (80 ml) was stirred at 80° C. for 16 hours. After cooling to roan temperature, the mixture was extracted with dichloroethane (2×150 ml). The combined extracts were dried over anhydrous magnesium sulphate and filtered and the solvent was in vacuo to afford the product (6.83 g, 97%) as a brown oil.

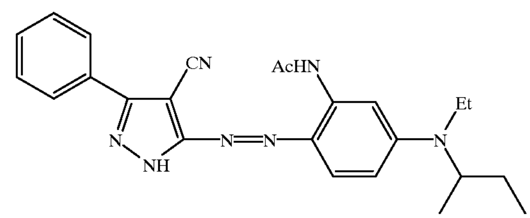

A solution of sodium nitrite (1.15 g, 0.02 mol) in water (3.5 ml) was added slowly to a stirred ice cold solution of 5-amino-4-cyano-3-phenyl-1(H)-pyrazole (0.73 g, 0.004 mol) in glacial acetic acid (35 ml) and concentrated hydrochloric acid (4.2 ml, 0.04 mol). The temperature was kept below 5° C. during the period of addition and for a further hour afterwards. Excess nitrous acid was destroyed by the addition of a small amount of solid sulphamic acid. The cold diazo solution was added to a solution of 3-(N-sec-butyl-N-ethylamino)-acetanilide (0.92 g, 0.004 mol) in water (45 ml) and concentrated hydrochloric acid (3.5 ml) cooled to below 5° C. The mixture was stirred for 1 hour at this temperature before being diluted with water (100 ml). Solid sodium acetate was added until the mixture was no longer acid to Congo Red paper. After 1 hour at room temperature, the precipitated solid was collected by suction filtration and washed with water. The damp paste was dissolved in dichloromethane (75 ml) and washed with water (3×50 ml). The dichloromethane solution was dried over anhydrous magnesium sulphate, filtered and evaporated to dryness in vacuo. Dry column chromatography of the crude product furnished the pure monoazo dye (0.4 g, 24%) as a dark red solid.

EXAMPLE 2

Preparation and Use of Inks for Glass Coating

A stock polymer precursor solution can be prepared by mixing the following components: 56.65% by weight SYNOCRYL 836S (an acrylamide available from Cray Valley Products), 8.0% EPIKOTE 1001 X75 (an epoxy available from Shell Chemicals) and 35.35% methyl ethyl ketone (MEK).

Ink samples can be made as follows: A mixture of the stock solution (0.31 g), dyestuff (0.05 g) and MEK (0.13 g) is shaken in a small vial with glass beads until homogeneous.

The resultant ink which contains 10% dyestuff and 25% solid resin can be coated onto a clean glass surface using a suitable wire-wound coating bar to give a wet film thickness of ca. 6 mm, eg using a No. 1 K-bar as supplied by RK Print—Coat Instruments Ltd. The coating is dried for 30 minutes at ambient temperature before the resin is fully cured by heating at a temperature of 180° C. for 30 minutes.

The cured film is approximately 2 mm in thickness and exhibits excellent transparency, adhesion and resistance to strong organic solvents. In addition, heat resistance is excellent (2 hours at 200° C.; $DE_{ab}$<5) as is the photostability (200 hours at 67KLux; $DE_{ab}$<5).

EXAMPLE 3

This Example illustrates a typical formulation of polymer-reactive dye and polymer precursor suitable for application to a transparent substrate by ink-jet printing.

| Constituent | Percentage by Weight |
|---|---|
| Stock polymer precursor (see below) | 50 |
| Ethylene glycol | 20 |
| Distilled Water | 24 |
| Ammonia solution (density 0.880) | 2 |
| Dye (solid, water soluble) | 4 |

The stock polymer precursor is made up of the following constituents:

| Constituent | Percentage by Weight |
|---|---|
| CYMEL 327 (90% strength) | 11 |
| Distilled Water | 18 |
| 2-Amino-2-methyl-1-propanol | 0.5 |
| 2-Methyl-2,4-pentane diol | 3 |
| 2-n-Butoxyethanol | 2 |
| SURFYNOL 104E | 0.5 |
| NEOCRYL XK69 (47.5% strength) | 65 |

Notes

CYMEL 327 is a melamine-formaldehyde condensate included as a cross-linking agent.

The 2-amino-2-methyl-1-propanol is added as a base.

The 2-methyl-1-2,4-pentanediol and the 2-n-butcxyethanol are added as coalescents.

SURFYOL 104E is a surfactant comprising a hydroxyalkyl alkyne.

NEOCRYL XK69 is a styryl-(meth)acrylate co-polymer.

SYNOCRYL, EPIKOTE, CYMEL, SURFYNOL and NEOCRYL eye registered trade marks

We claim:

1. A process for preparing an entity selected from:

an optical filter comprising a coloured cross-linked polymeric coating on a transparent substrate; sand a transparent, coloured cross-linked polymeric coating on a substrate;

the process comprising applying to the substrate by a printing process a mixture comprising:

one or more cross-linkable polymer precursor(s) for the cross-linked polymer of the polymeric coating; and one or more dye(s) each capable of forming a covalent bond with group(s) of at least one of the polymeric precursor(s) via one or more heterocyclic NH group(s) in a heterocyclic part of the dye or via one or more substituent group(s) each of which is attached to the dye either directly or via optionally substituted alkyl or aryl groups; where the substituents are selected from —OH; $—NH_2$, —NHalkyl; —SH; —COOH, —COOalkyl; epoxy, —NHCOalkenyl; and —COalkenyl; and thereafter curing the mixture.

2. A process according to claim 1, in which the printing process comprises ink-jet printing.

3. A process according to claim 1, in which the substrate is glass.

4. A process according to claim 1, in which the polymer precursor(s) is/are selected from cross-linkable forms of: acrylamides, epoxides, epoxy resins, acrylamide/epoxy resin systems, melamine formaldehyde resin condensates, polyesters, alkyd resins, hydroxylated or carboxylated acrylics and hydroxylated acrylic-melamine formaldehyde systems.

5. A process according to claim 1, in which the polymer precursor(s) is/are selected from cross-linkable forms of: acrylamide/epoxy in systems and hydroxylated acrylic-melamine formaldehyde systems.

6. A process according to claim 1, in which the dye is selected from the group consisting of the monoazo, disazo, azomethine, quinophthalone, oyanine, pyrroline, maleimide, thiophenedioxide, anthraquinone, phthalocyanine, benzofuranone, benzodifuranone, triphenodioxasine, triphenazonaphthylamine, styryl, dithiene and pyrrole dye classes.

7. A process according to claim 1, in which the dye(s) is/are of Formula:

A—N═N—D in which:

A is an optionally substituted heterocyclic or carbocyclic group; and

D is an optionally substituted heterocyclic or carbocyclic group or a group of Formula —E—N═N—G; where E and G each independently is an optionally substituted heterocyclic or carbocyclic group;

the dye comprising one or more heterocyclic NH group(s) or one or more substituent group(s) as defined in claim 1.

8. A process according to claim 1, in which the dye(s) is/are of Formula:

$MPc(X)_n$ in which:

M is H, Si, Ge, metal, oxymetal, hydroxymetal or halometal;

X is, or carries, one or more heterocyclic NH group(s) or one or more substituent group(s) as defined in claim 1;

n is from 1 to 16; and

Pc is; a phthalocyanine nucleus.

9. A process according to claim 1, in which the dye is of Formula:

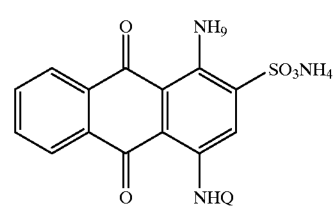

in which Q is a meta or para linked group of Formula:

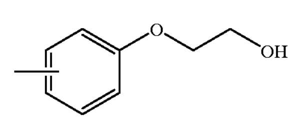

10. A process according to claim 1, in which the mixture is cured thermally.

11. A process according to claim 1, in which the dye is of Formula:

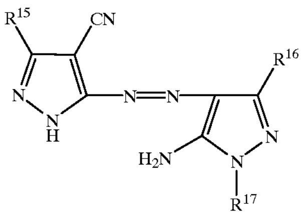

in which:

$R^{15}$ is phenyl, —$CH_2CN$ or —CN:

$R^{16}$ is $C_{1-4}$-alkyl; and $R^{17}$ is —H or phenyl.

12. A process according to claim 10, in which the dye comprises:

2-(4-cyano-3-phenyl-1(H)-pyrazole-5-azo)-5-(N-sec-butyl-N-ethylamino)acetanilide.

13. An optimal filter, comprising red, green and blue filter elements, and comprising a coloured polymeric coating on a transparent substrate prepared by a process as claimed in any of claims 1 to 12.

14. A dye of Formula:

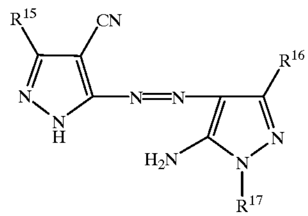

in which:

$R^{15}$ is phenyl, —$CH_2CN$ or —CN;

$R^{16}$ is $C_{1-4}$-alkyl; and $R^{17}$ is —H or phenyl.

15. A dye according to claim 14, in which the dye comprises:

2-(4-cyano-3-phenyl-1(H)-pyrazole-5-azo-(N-sec-butyl-N-ethylamino)acetanilide.

* * * * *